Sept. 27, 1960     J. A. VAN HORN ET AL     2,953,896
BALANCE WHEEL
Filed Feb. 7, 1955
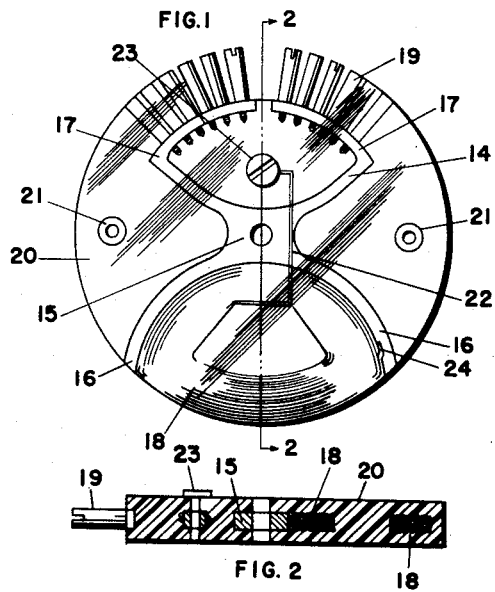
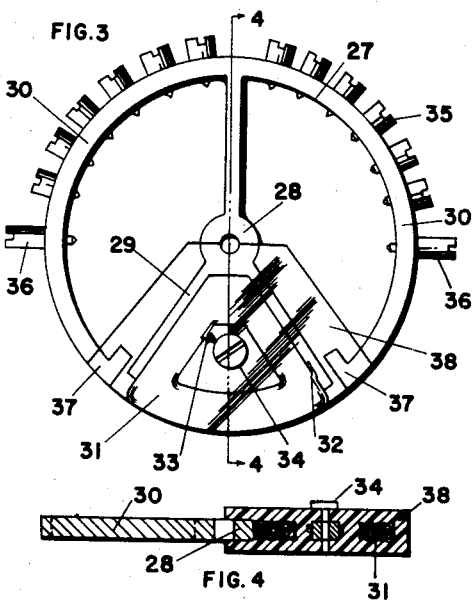
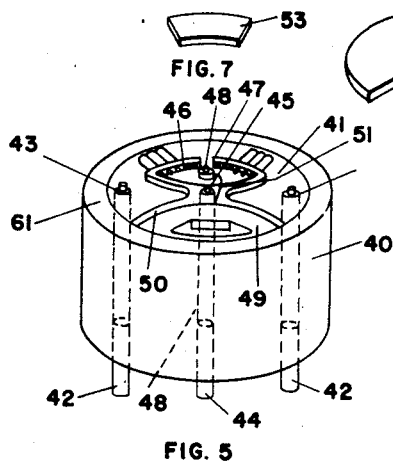
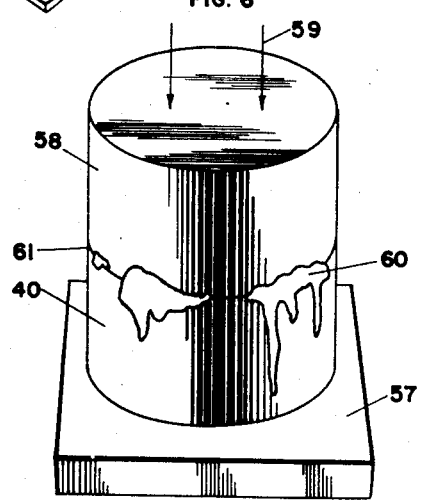
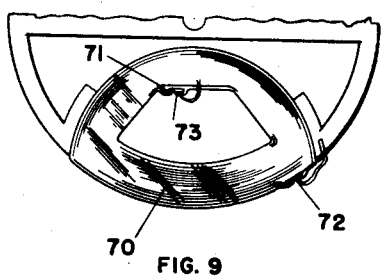
INVENTOR
JOHN A. VAN HORN
PHILIP E. BIEMILLER
JAMES H. REESE
BY *m. w. Gould*
ATTORNEY

United States Patent Office 2,953,896
Patented Sept. 27, 1960

2,953,896

BALANCE WHEEL

John A. Van Horn, Manheim Township, Lancaster County, Philip E. Biemiller, Landisville, and James H. Reese, Manheim, Pa., assignors to Hamilton Watch Company, Lancaster, Pa.

Filed Feb. 7, 1955, Ser. No. 486,342

6 Claims. (Cl. 58—28)

This invention relates to a balance wheel for electric watches of the type having a coil oscillating through a permanent magnetic field.

This invention is a continuation in part of the invention shown and described in patent application filed February 8, 1954, Serial Number 408,944, now abandoned.

The object of the present invention is to provide for a small battery operated electric wrist watch, a balance wheel supporting a coil for oscillation through a permanent magnetic field and to protect the coil from abrasion during the necessary handling of the balance wheel during the assembling or subsequent repairing operations.

A further object of the present invention is to provide a plastic cast balance wheel which during its oscillating motion will present less exposed surface to air resistance.

A further object of the present invention is to provide a plastic cast balance wheel in which the elements in the wheel are embedded in a plastic bond which will protect the parts of the wheel against abrasion during the necessary handling.

A still further object of the present invention is to provide a plastic cast balance wheel in which certain of the parts may be electrically insulated from other parts.

It is a still further object of the invention to provide an electric coil to be secured to the balance wheel, which said coil is coated with a plastic resin either by dipping or by brushing to protect said coil during the normal operation of the watch and during assembling or disassembling of the watch parts for purposes of manufacture or repair.

It is a still further object of the present invention to set forth the different steps in the manufacture of a plastic cast balance wheel.

The invention is shown in the accompanying drawing in which:

Figure 1 is a top plan view of the balance wheel.

Figure 2 is a view on line 2—2 of Figure 1.

Figure 3 is a top plan view of a slightly different form of the wheel.

Figure 4 is a sectional view on line 4—4 of Figure 3.

Figure 5 is a view of the form showing the different parts of the balance wheel in place for the casting operation.

Figure 6 shows the form having a top thereon.

Figure 7 shows one form of stop-off shield.

Figure 8 shows another form of stop-off shield.

Figure 9 shows a coil coated with plastic separated from the balance wheel.

Referring particularly to Figures 1 and 2, a metallic framework 14, substantially in the form of a figure 8, has a central hub portion 15, lower arms 16 and upper arms 17.

Positioned between the lower arms is a wire coil 18 formed of wire .001 of an inch or smaller and having about 1,000 turns. Diametrically opposite the coil and carried by the inturned ends of the upper arm 17 are a plurality of balancing screws 19, interchangeable to vary the weight and to counterbalance the weight of the coil.

Completely embedding the coil and portions of the framework and screws is a plastic body portion 20 formed from an epoxy resin and completely covering the coil to protect the coil from any abrasion. Poising weights 21 in the form of washers are embedded at diametrically opposite points in the plastic body 20. The position of said washers is 90° from the center line of said coil so that the balance wheel may be poised in one position by means of the counterbalancing weights 19 and in the other position by removing a certain amount of metal from either of the poising washers 21. These poising washers are cast flush with the plastic so that the removal of a slight amount of metal from the inside diameter of the washer will not break the seal by rupturing the plastic. All other parts such as the balancing screws, the coil and the framework are of a thickness less than that of the plastic casting so that they can be completely embedded within the plastic. A nut is embedded in the plastic and attached to one end 22 of the wire coil and has threaded thereon a screw 23 so that electrical connection may be made to one end of the coil. The other end of the coil 24 is connected to the framework and grounded to portions of the watch through a balance staff (not shown) mounted in the hub 15.

Referring particularly to Figures 3 and 4, a slight modification of the balance wheel is shown in that a framework 27 having a hub 28 is formed with an inverted Y-shaped central portion 29 and a pair of semicircular arms 30 extending from the stem portion of the Y and terminating short of the V-shaped portion. Carried between the V-shaped arms of the inverted Y and positioned between them is a coil 31, one end of said coil being connected to one portion of the framework 29 at 32 and to a nut at 33. A screw 34 is threaded into the nut to carry an extended contact (not shown). The leg portion of the inverted Y is continued in the form of a pair of semicircular arms 30 and has mounted thereon counterbalancing screws 35. The pair of screws 36 located at diametrically opposite portions on the semicircular arms 30 and at 90° from a radial line passing through the center of the coil are used as poising or timing screws. The coil 31 and its embracing arms and the ends 37 of the semicircular arms 30, as well as half of the hub 28, are embedded in a plastic body 38 which completely covers the coil in a protective coating.

Referring particularly to Figures 5, 6, 7, and 8, the method of making the plastic cast balance wheel will be briefly described. A block 40 formed of Teflon or of other material coated with a releasing coating has a circular recess 41 formed in its top and in depth equal to the thickness desired for the balance wheel. A pair of pins 42 are located on a diameter and substantially near the outer circumference of the recess and extend into the recess to receive poising washers 43. A central pin 44 in a like manner receives the hub 45 of the metallic framework 46. A nut which was originally in the form of a metallic washer 47 is in a like manner received in a pin 48. These pins are formed of Teflon or other material to which the plastic casting will not adhere. The framework 46 is placed in position over the central pin 44 and a coil 49 positioned between the lower arms of the framework, one end of the coil being connected to the framework at 50 and the other end 51 of the coil 49 is connected to the washer 47 by soldering or otherwise. A shield which may be in the form shown at 53 in Figure 7, or 54 in Figure 8, is placed over that portion of the balance wheel which it is desired to exclude from the plastic casting.

The plastic is now added by simply pouring said mixture which in this instance is an epoxy resin, liquid at room temperature and hardened by the addition of a curing agent and which may or may not contain a filler such as quartz powder. The block 40 is then placed on a base 57 and a cap 58 placed over the block 40 and sufficient pressure indicated at 59 is put on the cap 58 to remove all excess material 60 from the casting, the rim 61 meeting the cap 58 determining the thickness of said casting. After curing, the cap 58 is removed and the pins pressed to lift the casting from the recess 41.

The epoxy resin used is a condensation of epichlorohydrin (1-chloro-2,3-epoxypropane) and bisphenol A (2,2-bis(p-hydroxyphenyl)propane). This resin should be a 100% reactive liquid resin with an amino-type curing agent. There are probably over two hundred of these liquid epoxy resins which will serve the purpose.

As a curing agent, use is made of any amine such as piperidine or triethylene tetramine. As a filler, use has been made of either fused quartz or powdered glass. Experiments have proved that fused quartz is slightly better in decreasing the coefficient of linear expansion and reducing moisture absorption. In using as a casting, the percentage of resin to curing agent to filler is 2:1:1, by weight. Where the plastic is used as a dip or applied by a brush, the percentage will be resin to curing agent 2:1, no filler being used. These specific examples are given to illustrate the invention. Other amines and other fillers securing the same result are adaptable.

Referring particularly to Figure 9 which shows a modification, a coil 70 is shown coated with plastic, either by dipping or brushing. The terminal ends are reinforced by small metallic plates 71 to which leads 72 and 73 are attached. In the modification the coil alone is coated with a plastic and secured to the balance wheel by adhesive or by mechanical means.

The balance wheel thus formed is one which will resist all fluids used in cleaning a watch and which may be handled by watch repairmen or in the assembly of the watches when made without danger of disturbing the insulation of the coil. The balance wheel thus formed is one which will also stay poised when once it is poised.

What is claimed is:

1. A balance wheel for electric watches having a plastic cast body of the epoxy resin type, comprising a wire coil, metallic means for supporting the coil, said metallic means serving as a hub for rotating the wheel, means for counterbalancing the weight of said coil with respect to the axis of rotation of the wheel, said counterbalancing means being located diametrically opposite said coil, means carried by said body to serve as a terminal for one end of the wire coil, the other end of said coil being connected to the metallic supporting means.

2. A balance wheel for electric watches, comprising a plastic body of the epoxy resin type, a coil embedded in said body, means for counterbalancing said coil with respect to the axis of rotation of the wheel and terminal connections for said coil carried by said body.

3. A balance wheel for electric watches, comprising a metallic framework, a coil positioned by said framework and having one end connected to said framework, means carried by said framework to counterbalance the weight of said coil with respect to the axis of rotation of the wheel, a plastic casting of the epoxy resin type embedding said coil and portions of said framework, metallic means carried at diametrically opposite points in said plastic casting and a terminal embedded in said plastic casting and connected to the other end of said wire coil.

4. A balance wheel for electric watches, comprising a metallic framework including a central hub, a coil positioned and partially enclosed by said framework, one end of said coil being connected to said framework, means carried by said framework for counterbalancing the weight of said coil with respect to the axis of rotation of the wheel, a plastic casting of the epoxy resin type substantially embedding said coil and part of said framework and its counterbalancing means, a terminal embedded in said casting and insulated from said framework and connected to the other end of said wire coil and a pair of weights located at diametrically opposite points embedded in said plastic casting, said weights being equal distances from said hub and partially exposed from said plastic casting.

5. A balance wheel for electric watches, comprising a framework having a hub, a coil positioned by said framework, means carried by said framework for counterbalancing said coil with respect to the axis of rotation of the wheel, an epoxy resin coating for said coil and portions of said framework, and a terminal carried by said resin coating and connected to one end of said coil.

6. A balance wheel for electric watches, comprising a framework having a hub, a coil positioned and partially enclosed by said framework, means carried by said framework counterbalancing said coil with respect to the axis of rotation of the wheel, an epoxy resin coating covering said coil and portions of said framework and a terminal carried wholly by said epoxy resin and connected to one end of said coil.

References Cited in the file of this patent

UNITED STATES PATENTS

| 2,484,215 | Foster | Oct. 11, 1949 |
| 2,495,858 | Marti | Jan. 31, 1950 |
| 2,894,367 | Gingrich | July 14, 1959 |

FOREIGN PATENTS

| 501,215 | France | Jan. 19, 1920 |
| 523,885 | France | Apr. 30, 1921 |

OTHER REFERENCES

Epoxy Resins, pages 15–18, 48, 49 of Paint & Chemical Review of November 9, 1950.

Epoxies, pages 89–94 of Modern Plastics, October 1952.

Copies of the above publications may be found in Division 50 of the U.S. Patent Office.

Progress Report on Epoxy Resins, page 24 of Paint, Oil & Chemical Review of November 20, 1952.